United States Patent [19]
Ridgway, Jr. et al.

[11] 3,847,750
[45] Nov. 12, 1974

[54] AEROBIC FERMENTATION APPARATUS

[75] Inventors: John A. Ridgway, Jr., LaPorte, Ind.;
Terry A. Lappin, Palos Heights;
Benny Moses Benjamin, Chicago,
both of Ill.; Joseph B. Corns,
Munster, Ind.; Cavit Akin,
Oakbrook, Ill.

[73] Assignee: Standard Oil Company, Chicago, Ill.

[22] Filed: Mar. 7, 1973

[21] Appl. No.: 338,751

Related U.S. Application Data
[62] Division of Ser. No. 85,334, Oct. 30, 1970, abandoned.

[52] U.S. Cl................ 195/142, 195/143, 195/139
[51] Int. Cl............................................. C12b 1/00
[58] Field of Search ........... 195/142, 143, 139, 127; 165/172, 173, 174, 175

[56] References Cited
UNITED STATES PATENTS
| | | | |
|---|---|---|---|
| 3,445,341 | 5/1969 | Freedman et al. .................. | 195/142 |
| 2,312,217 | 2/1943 | King et al. .......................... | 165/175 |
| 3,681,200 | 8/1972 | Ridgway, Jr. ....................... | 195/142 |
| 3,326,279 | 6/1967 | Eisberg et al. ...................... | 165/173 |

*Primary Examiner*—Alvin E. Tanenholtz
*Attorney, Agent, or Firm*—Werten F. W. Bellamy; Arthur G. Gilkes; William T. McClain

[57] ABSTRACT

Yeasts are grown aseptically by an improved aerobic fermentation process, employing an aqueous ethanolic substrate fortified with nutrient elements, preferably under oxygen-limited conditions. Fermentation is effected in a continuous manner in a zone maintained under super-atmospheric pressure. Micro-nutrients are added to the substrate separately from macronutrients as a sterile aqueous solution, preferably containing iron as ferric citrate. A preferred yeast is *Candida utilis*.

3 Claims, 4 Drawing Figures

3,847,750

AEROBIC FERMENTATION APPARATUS

This is a division, of application Ser. No. 85,334, filed Oct. 30, 1970 and now abandoned.

BACKGROUND OF THE INVENTION

Recent concern for the welfare of the world population has included consideration of additional means for feeding the rapidly increasing number of people involved. The problem embraces providing both adequate per capita caloric intake and a balanced diet, with particular reference to the acknowledged lack of sufficient protein-affording— foods in many parts of the world. One means for providing necessary protein supplies is through the growth of single-cell protein-affording microorganisms, such as yeasts, bacteria and algae, for use as either foods or food supplements.

Production of single-cell protein (SCP) materials in large quantity may be accomplished by fermentation processes employing, for example, carbohydrate, hydrocarbon or oxygenated hydrocarbon materials as substrate. Principal requirements are that the substrate material be inexpensive and readily consumed by the selected microorganism so that process costs are not excessive. Equally important is the acceptability and utility of the SCP material as a food or food component. The latter considerations include taste and odor factors relating to public acceptance as well as metabolic and toxicity factors relating to suitability of SCP material for inclusion in the human diet.

Both the technical and the patent literature describe fermentation processes for production of microorganisms which readily afford useful SCP materials. For example, yeasts have been grown on the polysaccharides contained in waste sulfite liquor, the normal alkane components of a gas oil hydrocarbon fuel, and on a mixture of oxygenated hydrocarbons. Production of bacteria has been similarly described. Fermentation to produce yeasts or bacteria comprises an oxidation process, evolving much heat and requiring both substantial oxygen transfer and good control of fermentation temperature. Preferred substrate materials will already contain as much combined oxygen as possible in order to minimize the heat release and the oxygen requirement. Production of food-grade SCP material may also require an extraction step to limit the presence of undesirable, residual substrate material such as high-molecular-weight hydrocarbons or slowly fermented oxygenated hydrocarbon species.

Most of the fermentation processes planned or in use currently for production of SCP material are intended to provide primarily an animal feed supplement and hence to suply protein for human consumption only indirectly. However, certain microorganisms, notably yeasts within the *Saccharomycetoideae* and *Cryptococcoideae* sub-families, have been certified by the Food and Drug Administration for direct use in foods intended for human consumption.

One highly desirable substrate material is ethanol. It exhibits complete water solubility, is already in a partially-oxidized state, is itself acceptable for use in foods, and creates no problem as to removal from the produced microorganism cells. However, ethanol is a growth inhibitor to many microorganisms and some others do not grow well in its presence.

The economics of SCP production require that the substrate material be relatively inexpensive. In comparison with waste materials employed as substrates in many commercial fermentations, ethanol is sufficiently expensive to require that it be used most efficiently if selected to serve as a substrate.

SUMMARY OF THE INVENTION

It is the purpose of this invention to provide an improved aerobic fermentation process and apparatus for the continuous production of food yeasts.

Another object of this invention is to employ optimally the inorganic nutrient materials necessary to the growth of the desired yeasts.

It is a further object of this invention to provide an economic source of high-quality protein material, for use as a food or food ingredient intended for human consumption, by utilizing the growth of a yeast having FDA approval for use in foods on a substrate possessing a high proportion of combined oxygen and being itself of acceptable food quality. Specifically, a food yeast such as *Candida utilis* (Torula yeast) is grown on an ethanol substrate under conditions selected for maximum conversion of the substrate to a useful protein product.

Further objects will be evident from the following description of the invention.

DESCRIPTION OF THE DRAWINGS

The attached drawings are illustrative of typical embodiments of this invention.

FIG. 1 presents in schematic fashion one embodiment of the invention, comprising a yeast production process operating continuously under steady-state conditions employing ethanol as a substrate.

Figure 1:
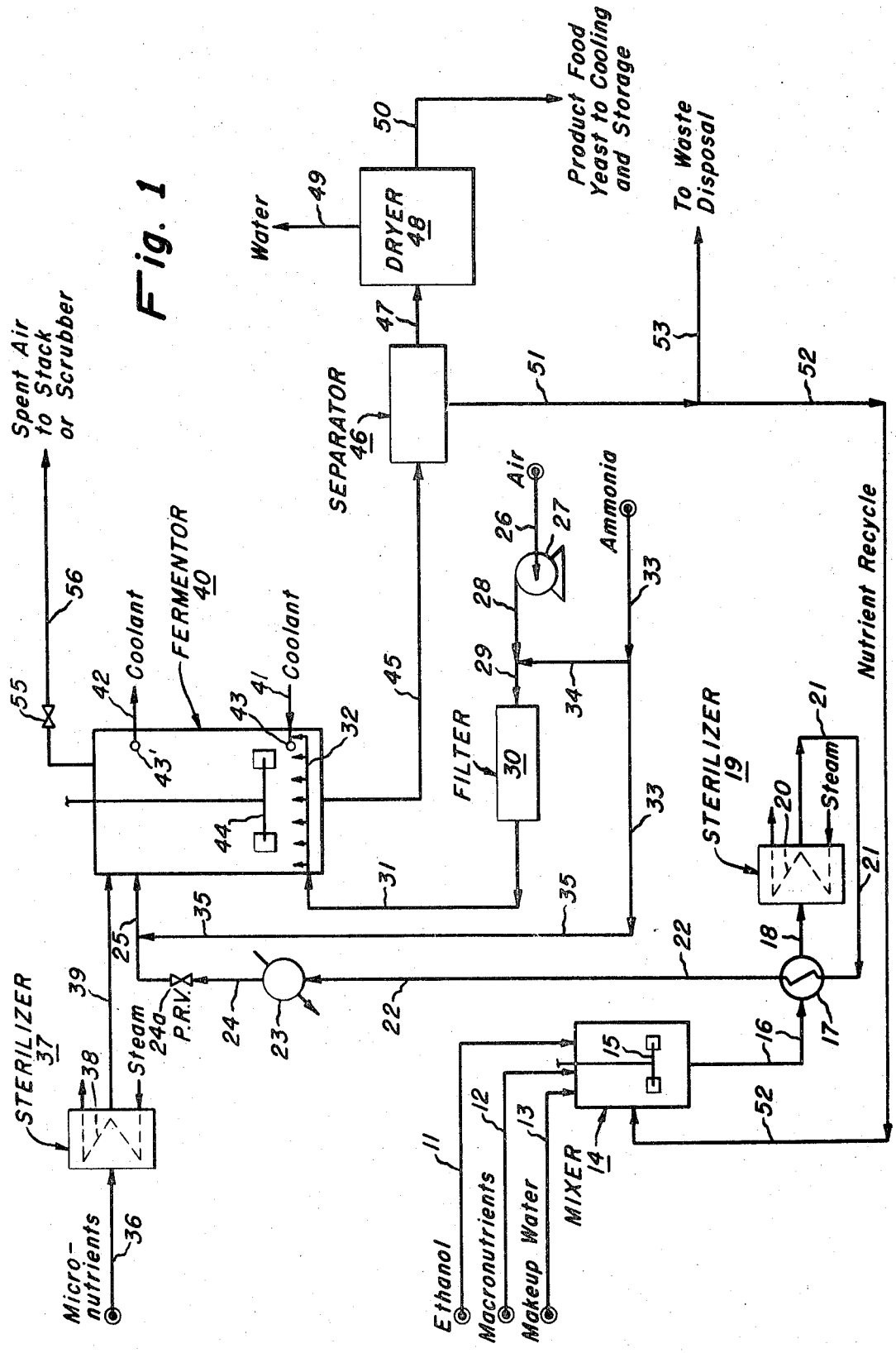
FIG. 1 illustrates a flow process pattern.

In this embodiment of the invention mixer 14 is fed with ethanol through line 11, a concentrated solution of macronutrients through line 12, and make-up water through line 13. Nutrients contained in at least a portion of the liquid fermentor effluent are also fed to mixer 14 through line 52. After thorough mixing with stirrer 15 the solution is pumped by means not shown through line 16, preheater 17, and line 18 to sterilizer 19. Steam is supplied to the sterilizer through coil 20. Optionally steam may be injected directly into line 18 by means not shown. After sterilization the solution is passed through line 21, preheater 17, line 22, cooler 23, line 24, pressure-reducing valve 24a and line 25 to fermentor 40. The micronutrients, including iron citrate, are supplied as an aqueous concentrate through line 36, sterilizer 37 and line 39. Steam for the sterilizer is supplied through coil 38. Air is continuously taken in through line 26 to compressor 27 and the compressed air stream is then passed through lines 28 and 29, sterilizing filter 30, and line 31 to air sparger 32 situated in the bottom section of fermentor 40. Ammonia from liquid storage is vaporized and passed through lines 33 and 34 into the compressed air stream so that the air-ammonia mixture is carried through line 29, filter 30 and line 31 to sparger 32. Optionally the vaporized ammonia stream may be fed to fermentor 40 by means of lines 35 and 25.

The continuous supply of substrate, nutrients and oxygen effects a continuous multiplication of yeast cells (originally added as a batch starter culture prepared in equipment not shown) within fermentor 40. Agitation of the gas-liquid-solid mixture is accomplished with agitator 44 and sparger 32. Metabolism of the ethanol by yeast generates a substantial amount of heat so that a coolant is circulated through line 41, cooling coil 43–43[1] and line 42.

Fermentation broth is continuously removed from fermentor 40 through bottom draw-off line 45 to separator 46 where most of the liquid, containing residual substrate and nutrient material, is separated from the yeast cells. The separated liquid phase is removed from the separator through line 51 and either returned to mixer 14 through line 52 or sent to waste disposal through line 53. The product yeast cells, in the form of a cream, are removed from the separator through line 47, optionally washed in equipment not shown, and sent to drier 48. Removed water leaves the drier through line 49 and the dried food yeast product is taken through line 50 to cooling and storage.

The spent air stream, containing product carbon dioxide, is continuously removed from fermentor 40 through line 54, pressure-responsive automatic valve 55 and line 56. Line 56 transmits the spent air to an appropriate stack, or, when the spent air contains a significant amount of entrained ethanol, to a wtaer scrubber, not shown. Water from the scrubber, containing recovered ethanol, may serve as make-up water supplied through line 13 to mixer 14.

Figure 2:
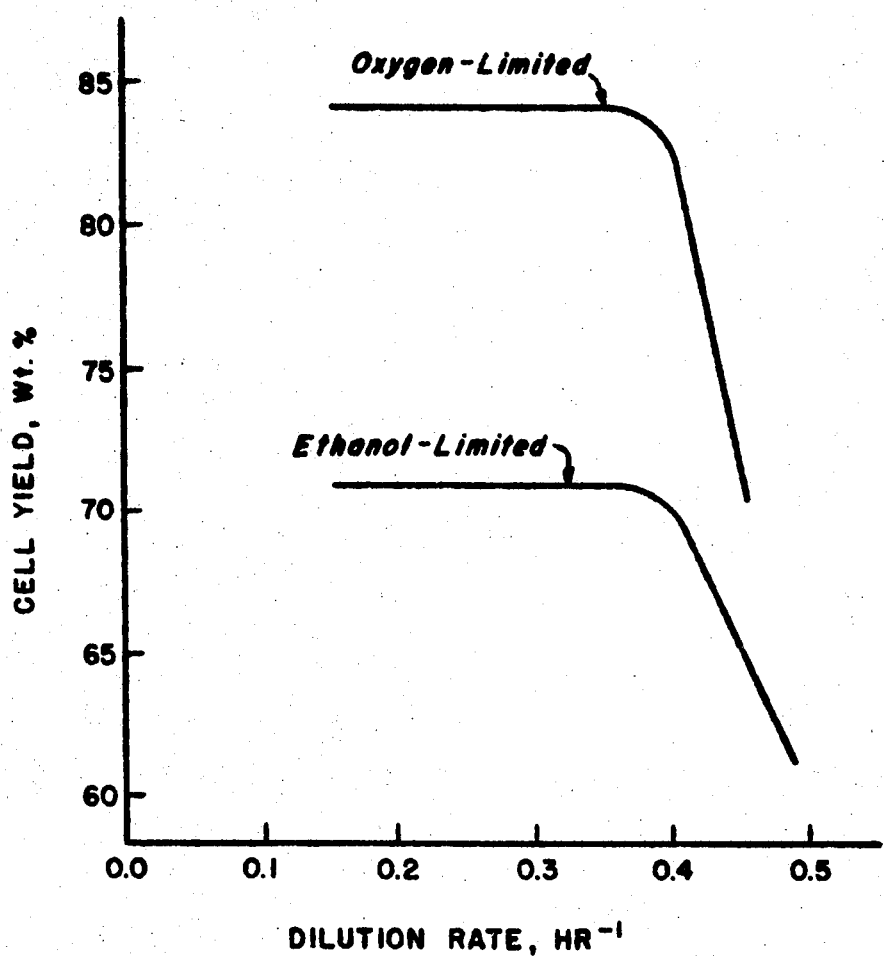
FIG. 2 presents illustrative data in chart form.

FIG. 2 presents a graphic illustration of results obtained employing a particularly advantageous mode of practicing the invention. It is discussed further in relation to Example V and Table III.

Figure 3:
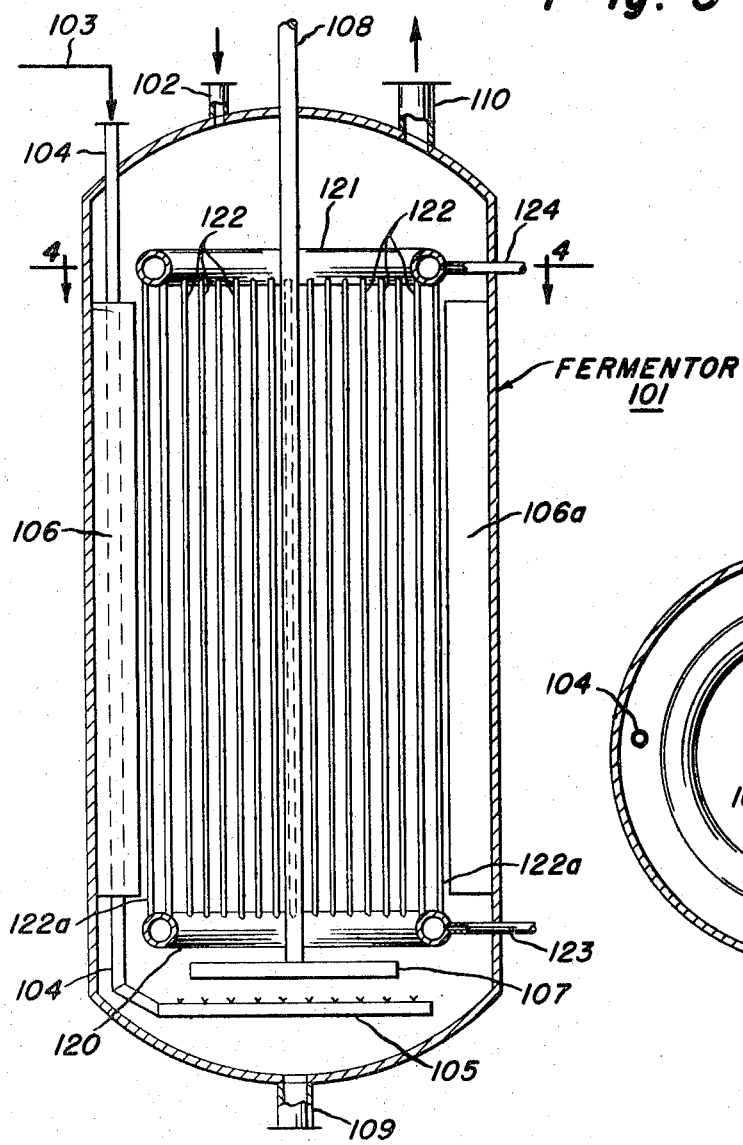
FIGS. 3 and 4 describe an embodiment of apparatus particularly applicable to the practice of this invention.

FIG. 3 presents an elevational view partly in cross-section setting forth details of an eminently suitable internal cooling apparatus for use in the fermentation process of this invention.

The embodiment of the "bird-cage" cooling apparatus shown in FIG. 3 is contained within fermentor vessel 101 which is conventionally fitted with nutrient inlet 102, air inlet line 103, air inlet extension line 104, air sparger 105, baffles 106 and 106a, agitator 107 connected by shaft 108 to external drive means not shown, fermentation broth outlet 109 and air outlet 110.

The cooling apparatus comprises horizontal circular header pipes 120 and 121, having substantially the same mean diameter, joined together by a plurality of vertical connector pipes illustrated by 122 and 122a, arranged in two parallel rows around the circumference of header pipes 120 and 121. The connector pipes 122, 122a have a diameter no greater than about 1/3 that of the header pipes and extend roughly three-fourths the length of fermentor vessel 101. The bottom header pipe 120 is attached to coolant inlet line 123 and upper header pipe 121 is attached to coolant exit line 124, both of lines 123 and 124 sealably extending through the wall of fermentor vessel 101.

In practice liquid ammonia coolant enters header pipe 120 through line 123 and is distributed to connector pipes 122, 122a which provide surface for heat transfer with the agitated fermentation broth contained in fermentor vessel 101. The ammonia vaporizes as it absorbs heat from the broth, passing as a mixture of liquid and vapor into header pipe 121 and coolant exit line 124. The vapor-liquid mixture is then separated, the vapor stream is compressed by means not shown, and the resulting liquid is added to the separated liquid to provide a liquid ammonia stream for recycle to coolant inlet 123.

Figure 4:
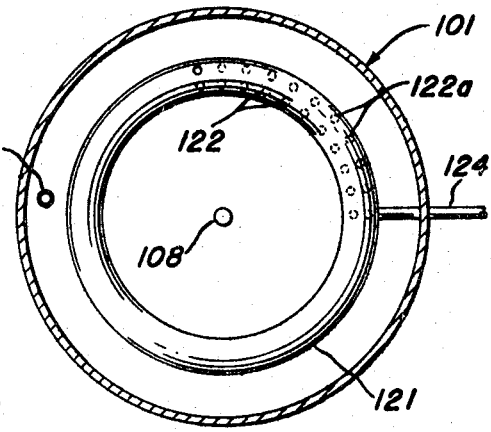

FIG. 4 provides a cross-section view of the cooling apparatus of FIG. 3, taken at horizontal plane 4—4, showing the circular header pipe 121 positioned within fermentor vessel 101 and receiving the upper ends of the vertical connector pipes 122, 122a. The header pipe is attached within the fermentor vessel 101 to coolant exit line 124 which extends through the wall of fermentor vessel 101. A complementing arrangement, not shown, is provided at a horizontal plane taken through the lower header pipe 120.

DESCRIPTION OF THE INVENTION

This invention embraces the aseptic growth of selected yeasts on an ethanol substrate in a continuous manner, providing for optimized utilization of selected nutrient elements, including iron. The choice of ethanol as the sole source of carbon in the substrate eliminates substantially problems relating to production of protein material suitable for direct human consumption. Ethanol is readily available and accepted as a foodstuff. Its fermentation products will not contain toxic residual substrate. Its volatility assures that residual ethanol will be removed readily during drying of the microorganism product. Its solubility in water obviates multi-phase physical problems present with polysaccharide or hydrocarbon substrate materials.

Many microorganisms do not grow on alcoholic substrates. Suitable yeasts which do metabolize ethanol include those listed in Table I.

TABLE I

SUITABLE YEASTS FOR USE WITH ETHANOL SUBSTRATE

| | |
|---|---|
| Endomycopsis | Capsularis |
| do. | Fibulicer |
| do. | Javanensis |
| Saccharomyces | Cerevisiae |
| do. | Fragilis |
| do. | Lactis |
| Hansenula | Anomala |
| do. | Miso |
| do. | Mrakii |
| Pichia | Farinosa |
| do. | Fermentans |
| Candida | Utilis |
| do. | Guilliermondii |

Preferred yeasts include *Saccharomyces cerevisiae*, *Saccharomyces fragilis*, and *Candida utilis*. These are preferred because they already possess FDA approval for use in foods intended for human consumption.

Aerobic growth of the selected yeast is effected on a large scale in a continuous, aseptic fermentation process wherein sterile substrate, nutrients and oxygen are introduced continuously into a fermentor vessel while fermentation broth is continuously removed. Rapid exponential phase growth is maintained by control of the dilution rate (space velocity) through controlled addition of water to the fermentor. Suitable control devices are employed to maintain substantially steady-state conditions. Where the scale of yeast production is sufficiently large, it may be desirable to employ a plurality of fermentors in parallel arrangement. This affords better control of the fermentation while minimizing the shutdown costs should a fermentor become fouled in any manner. Fermentor effluents may thereafter be combined for subsequent downstream processing.

Within the fermentation zone ethanol is maintained as an aqueous substrate having a concentration in the range from 50 to 3000 ppm, preferably from 100 to 500 ppm and most preferably about 200 ppm. Inorganic nutrients are maintained in the fermentation broth by continuous addition of aqueous solutions containing the nutrient elements to provide the ratios shown in Table II.

TABLE II

INORGANIC NUTRIENTS IN FERMENTATION BROTH

| Nutrient Element | Typical Compound | Nutrient Element Input, wt./100 g. cells produced | |
|---|---|---|---|
| | | Broad Range | Preferred Range |
| MACRO-NUTRIENTS | | | |
| Phosphorus | $H_3PO_4$ | 1–5 g. | 2–4 g. |
| Potassium | KCL | 1–5 do. | 2–3 do. |
| Magnesium | $MgCl_2 \cdot 6H_2O; MgSO_4$ | 0.2–1 do. | 0.3–0.6 g. |
| Calcium | $CaCl_2$ | 0.001–1 g. | 0.001–0.2 g. |
| Sodium | $Na_2CO_3 \cdot H_2O; NaCl$ | 0.01–0.1 g. | 0.01–0.2 do. |
| MICRO-NUTRIENTS | | | |
| Iron | $Fe[C_3H_4(OH)(COO)_3]$ | 1–40 mg. | 6–13 mg. |
| Manganese | $MnSO_4 \cdot H_2O$ | 1–20 do. | 4–8 do. |
| Zinc | $ZnSO_4 \cdot 7H_2O$ | 0.5–20 do. | 2–6 mg. |
| Molybdenum | $Na_2MoO_4 \cdot 2H_2O$ | 0.1–10 do. | 1–2 do. |
| Iodine | KI | 0.1–10 do. | 1–3 do. |
| Copper | $CuSO_4 \cdot 5H_2O$ | 0.01–10 | 0.5–1 do. |

During the fermentation process ethanol is consumed with evolution of carbon dioxide gas and an increase in the acidity of the fermentation medium. Nitrogen is essential to the growth of the microorganisms and is conveniently added to the fermentation broth as either anhydrous or aqueous ammonia. Being an alkaline reagent, the addition of nitrogen as ammonia also serves to decrease acidity in the fermentation broth. The pH of the medium is maintained in the range from 2.5 to 6.5, preferably from 3.5 to 5.5 and most preferably at about 4.0. This pH control is achieved by controlled addition of ammonia.

The added inorganic nutrients are effective in promoting yeast growth only to the extent of their solubility in the fermentation broth. The requirement for phosphorus is customarily satisfied by addition of a phosphate salt or phosphoric acid. When iron is also required in the aqueous mixture of nutrients iron phosphate precipitates making iron less available to the fermentation process. It has now been found that an improved rate of yeast growth can be achieved by separately adding the micro-nutrient elements, including iron, to the broth. Iron is preferably introduced as the water-soluble salt of an organic polycarboxylic acid and most preferably as iron citrate. This salt may be formed in the aqueous solution by the appropriate additions of an inorganic iron salt, such as ferric chloride, and citric acid.

All liquid streams are sterilized by heating to about 300°F. under about 70 p.s.i.g. pressure prior to addition to the fermentor. Sterilization may also be accomplished by direct steam injection. No sterilization is normally required for the ammonia stream. When added as a gas, ammonia may conveniently be injected into the entering compressed air stream.

Air, optionally enriched with oxygen, is compressed and sterilized by filtration through a series of small-pore or membrane-type glass fiber filters. When mixed with ammonia the mixed gases are passed through the filter zone.

Care should be taken to maintain all sterile input streams at a higher pressure than non-sterile streams during heat exchange. Similarly the fermentor should be operated at a positive, superatmospheric pressure to prevent contamination with non-sterile materials.

Prior to initiating the fermentation all equipment should be sterilized. For example, it is preferred that the fermentor and all lines intended to pass sterile streams be treated for about 20 minutes with steam at a temperature of about 250°F.

In starting a fermentation, an initial loading of the fermentor with aqueous substrate, ammonia and nutrient elements is followed by innoculation of this aqueous medium with a culture of the selected yeast. Air is then sparged into the fermentor, usually with additional mechanical agitation provided. The fermentation zone is maintained at a temperature in the range from 80° to 110°F., and preferably about 90° to 100°F., while the top pressure is maintained within the range from 2 to 20 p.s.i.g., preferably about 10 p.s.i.g., to assist in preserving aseptic conditions. The initial slow growth of the yeast is superseded after a few hours by the rapid exponential growth which is thereafter maintained in the fermentor by withdrawal of fermentation broth, comprising aqueous medium and suspended cell product, at a rate selected to maintain a cell concentration in the range from 1.5 to 5.0 wt. percent, generally above about 2.0 wt. percent and preferably about 3.0 wt. percent, suspended in the fermentation liquor. The withdrawal rate maintaining this cell concentration should provide an average residence time for fermentation liquor in the fermentation zone in the range from 2 to 4 hours and preferably about 3 hours. Stated in different terms, the dilution rate should be in the range from 0.25 to 0.50/hr. and preferably should be about 0.33/hr.

Liquid level in the fermentor is maintained by addition of aqueous ethanol, aqueous nutrients and ammonia to preserve the desired concentration levels and acidity. The withdrawn fermentation broth is sent to a separation stage, preferably a centrifuge, for recovery of the cell product. The aqueous fermentation liquor discharged from the centrifuge may contain sufficient ethanol together with nutrient elements and ammonia to make this stream suitable for recycle. In a typical recycle operation about 80 percent by volume of this stream is admixed with the continuously added streams after a suitable sterilization. The 20 vol. percent discard serves to prevent buildup of less desirable inorganic ions such as chloride in the fermentation liquor.

The yeast cell product recovered from the separation zone may be washed with water, pressed and dried as required by the end use intended for the protein material.

Excess sterile compressed air is supplied to the fermentor after passage through a filtration zone. Oxygen utilization is usually in the range from 25 to 60 percent of input and most frequently about 33 percent.

The concentration of dissolved oxygen in the fermentation liquor should be within the range from 0.1 to 0.3 ppm under oxygen-limiting conditions and may range as high as 1 to 4 ppm when operating under ethanol-limiting conditions. Some foaming occurs in the fermentor but at the preferred low ethanol concentrations the foaming is not severe enough to require regular addition of an antifoam agent. Effluent air, containing product carbon dioxide, is exhausted from the fermentation zone through a pressure-responsive regulating valve, to maintain fermentor pressure and prevent entry of non-sterile materials which would contaminate the fermentor contents.

When the effluent gas stream contains a significant concentration of ethanol vapor it is desirable to pass this effluent stream through a water scrubber to recover the ethanol, later employing the ethanolic water as make-up to the fermentor.

The heat of fermentation is approximately 10,000 B.t.u./lb. cells so that temperature control within the range from 80° to 100°F. requires extensive cooling. Where water is available at a sufficiently low temperature, cooling may be effected by once-through water circulation through cooling elements contained within the fermentation zone. In other circumstances a closed refrigeration system employing a refrigerant non-toxic to the system is preferred. Suitable refrigerants include ammonia and the Freons. With such refrigerants a small amount of leakage into the fermentor will present no adverse effects. Where ammonia is employed as the refrigerant, liquid ammonia is circulated through the cooling element where it boils, extracting heat evolved within the fermentation zone.

A particularly effective cooling element for use in any vertical cylindrical fermentor vessel and particularly with the process of this invention comprises two circular circumferential header tubes fitted horizontally within the fermentor and connected by a plurality of vertical cylindrical tubes, selected to have a total cross-section area equal to that of the top header tube. The cylindrical vertical tubes are arranged in parallel rows about the circumference of the header tubes to describe a "bird-cage". Coolant circulates through the tubes which provide a large surface area for effective heat transfer.

Food industry practice should be followed in selecting equipment for use in the fermentation process of this invention. Type 304 stainless steel should be employed with foods or with liquids that eventually come in contact with food. Type 316 stainless steel is used where solutions contain high concentrations of chloride ion and where high temperatures are encountered. Whereever pressure and temperature requirements are not extreme, as in storage tanks, glass-fiber reinforced plastic may be used to effect a substantial saving in investment cost.

The yield of yeast cells, based on ethanol substrate consumed, is generally within the range from 65 to 90 wt. percent, the higher yields being achieved under oxygen-limiting rather than ethanol-limiting conditions. For either type of operation maximum cell yield is obtained at a dilution rate in the range from 0.25 to 0.4/hr.

The yeast cells produced typically contain about 40 to 60 wt. percent protein, together with polysaccharides, especially in the cell wall, and some nucleic acids. A representative analysis includes:

| | |
|---|---|
| Nitrogen, total | 9.2 wt. % |
| Nitrogen, protein | 7.8 wt. % |
| Carbon | 45.4 wt. % |
| Hydrogen | 6.7 wt. % |
| Phosphorus | 2.0 wt. % |
| Ash | 8.9 wt. % |

A typical amino acid profile and a typical vitamin content of Torula food yeast grown on ethanol are presented respectively in Tables III and IV.

Accordingly, a higher nutritive food or food ingredient comprising SCP material is made available by the practice of this invention.

EXAMPLES

The following examples illustrate, without any implied limitation, the practice of this invention.

TABLE III

AMINO ACID PROFILE OF ETHANOL GROWN TORULA YEAST

| | % of cell weight |
|---|---|
| Lysine | 3.5 |
| Histidine | 1.0 |
| Arginine | 3.5 |
| Aspartic Acid | 3.9 |
| Threonine | 2.3 |
| Serine | 2.1 |
| Glutamic Acid | 7.9 |
| Proline | 2.0 |
| Glycine | 2.5 |
| Alanine | 2.9 |
| Cystine | 0.3 |
| Valine | 2.6 |
| Methionine | 0.5 |
| Isoleucine | 2.1 |
| Leucine | 3.4 |
| Tyrosine | 1.6 |
| Phenylalanine | 1.8 |
| Typtophane | 0.02 |
| (Ammonia) | 1.4 |

TABLE IV

TYPICAL VITAMIN CONTENT OF ETHANOL GROWN TORULA YEAST

| | | |
|---|---|---|
| Biotin | 1.3 | $\mu$g./gm |
| Folic Acid | 10.6 | do. |
| Inositol | 4.7 | do. |
| Niacin | 387 | do. |
| Pantothenic Acid | 211 | do. |
| Panthenol | <200 | do. |
| P-Aminobenzoic Acid | 3.0 | do. |
| Riboflavin | 49 | do. |
| Vitamin B-6 | 42 | do. |
| Vitamin B-12 ca | 0.010 | do. |
| Cholin Chloride | 5.1 | mg./gm. |
| Vitamin A | <500 | u/lb. |

EXAMPLE I

In a 4-liter glass fermentor was placed 3 liters of aqueous mineral nutrient solution medium containing:

| | | |
|---|---|---|
| $KH_2PO_4$ | 1.0 | g./liter |
| $K_2HPO_3$ | 1.0 | g./liter |
| $NH_4Cl$ | 1.0 | g./liter |
| $MgSO_4$ | 1.0 | g./liter |
| $CaCl_2$ | 0.15 | g./liter |
| $CuSO_4 \cdot 5H_2O$ | 0.0001 | g./liter |
| $KI$ | 0.0002 | g./liter |
| $MmSO_4 \cdot H_2O$ | 0.0009 | g./liter |
| $Na_2MoO_4 \cdot 2H_2O$ | 0.0004 | g./liter |
| $ZnSO_4 \cdot 7H_2O$ | 0.0014 | g./liter |

To this medium was added 30 ml. ethanol and $FeCl_3$(0.001 g./liter). Air was sparged in with agitation to obtain an oxygen absorption rate in the range from 100 to 140 millimoles/liter/hour. The fermentor temperature was maintained at 30°C. and the pH was adjusted to 4.6 by addition of ammonia.

Freshly grown Torula yeast (*Candida utilis*) (50 ml. of 1 percent suspension) from a shaker culture was added to the fermentor. Cell growth was followed by measurement of optical denstiy during the aspectic batch fermentation. Active cell growth started after about 3 hours and stopped when the cell concentration reached 0.7 g./100 ml suspension.

The product was harvested by centrifugation and dried at 100°C. in an oven. The dry product was light brown in color and had a nutty flavor.

EXAMPLE II

The procedure of Example I was followed. When the cell concentration reached 0.6 g./100 ml., mineral nutrient solution, ammonia, and ethanol were pumped into the fermentor at a steady rate while withdrawing fermentation broth to maintain a space velocity of 0.3/hr. Cell concentration in the effluent was maintained at 0.6–0.7 g./100 ml.

EXAMPLE III

Continuous growth of *Candida utilis*, A. T. C. C. No. 9256, was effected in a 28-liter fermentor vessel. After initial sterilization with steam the fermentor was loaded with an aqueous nutrient medium containing:

| | | |
|---|---|---|
| $H_3PO_4$(85%) | 3.24 | g./liter |
| KOH | 1.28 | g./liter |
| NaOH | 0.02 | g./liter |
| $MgSO_4$ | 1.30 | g./liter |
| $CaCl_2 \cdot 2H_2O$ | 0.48 | g./liter |
| $FeCl_3 \cdot 6H_2O$ | 1.55 | mg./liter |
| $CuSO_4 \cdot 5H_2O$ | 0.10 | mg./liter |
| KI | 0.21 | mg./liter |
| $MmSO_4 \cdot H_2O$ | 1.84 | mg./liter |
| $Na_2MoO_4 \cdot H_2O$ | 0.41 | mg./liter |
| $ZnSO_4 \cdot 7H_2O$ | 1.00 | mg./liter |

Ethanol was added to provide a concentration of 0.2 wt. percent (2,000 ppm). Initially aqueous ammonia was added as a 30 percent solution in the amount of 1 ml./liter and was added thereafter as required to maintain pH 4.0 in the fermentor. An inoculum grown in a batch fermentor was added to provide a cell concentration of 0.1 g./100 ml. and allowed to grow at 90°F. through several doubling cycles as in a batch run. Addition of nutrient solutin and ethanol and continuous withdrawal of fermentor broth through a bottom draw-off line was then begun and maintained at a dilution rate of 0.33/hr. Throughout the run air was sparged in and the concentration of dissolved oxygen was maintained at approximately 10 ppm.

In continuous operation a cell concentration of only 0.6 g./100 ml. broth (essentially 0.6 percent) was achieved.

EXAMPLE IV

The continuous run of Example III was repeated except for a separate addition of the nutrient element iron apart from other components of the aqueous nutrient medium. The iron ($Fe^{+++}$) was stabilized in aqueous solution as a complex with citric acid.

In continuous operation, employing this modified nutrient addition system, the cell concentration lined out at 2.1 g./100 ml. broth (ca. 2.1 wt. percent). The cell yield, based on ethanol consumed, was 80.1 wt. percent. The doubling time was 2.2 hours. Harvested dry cells were produced at a rate of 0.34 lb./hr./cu. ft. fermentor volume.

EXAMPLE V

The procedure of Example IV was generally followed except for varying the concentrations of dissolved oxygen and ethanol to provide periods of oxygen-limited and ethanol-limited operation at selected dilution rates ranging from 0.25 to 0.47 hr. Data are presented in Table V and the experimental significance is illustrated in FIG. 2.

The oxygen concentration in the broth was about 0.3 ppm under oxygen-limited conditions which gave significantly better utilization of ethanol. In ethanol-limited operation the ethanol concentration was only about 40 ppm.

TABLE V

CELL GROWTH ON ETHANOL

| | Dilution Rate, hr.$^{-1}$ | | | | |
|---|---|---|---|---|---|
| | 0.25 | 0.33 | 0.4 | 0.44 | 0.47 |
| $O_2$ —Limited | | | | | |
| Cell yield[a] | 83.8 | 84.0 | 82.8 | 71.5 | — |
| N, wt. % | 8.7 | 8.9 | 9.1 | 9.2 | — |
| Protein, wt.[b] | 45.0 | 44.6 | 47.3 | 46.7 | — |
| EtOH-Limited | | | | | |
| Cell yield | 71.6 | 72.1 | 70.3 | 65.6 | 62.5 |
| N, wt. % | 8.9 | 9.3 | 9.1 | 9.1 | 9.6 |
| Protein, wt. % | 46.8 | 46.2 | 45.7 | 44.4 | 47.2 |

[a] Wt. % on ethanol consumed
[b] Calculated value (N-0.153 × Nucleic Acid) × 6.25

EXAMPLE VI

In the continuous production of Torula yeast (*Candida utilis*), grown on a substrate containing ethanol as the sole source of carbon, at the rate of 10,000 lbs./hr., there are provided six aerobic fermentors, each having a capacity of 50,000 gallons, arranged in two production trains. Each fermentor vessel has a diameter of 19 feet and a height of 25 feet. The use of several fermentors provide flexibility so that contamination of one fermentor still permits the plant to keep functioning.

In the process, ethanol (95 vol. percent: 2188 gal./hr) is mixed with macro-nutrient salts, make-up water (9700 gal./hr.) and nutrient recycle in the manner described in FIG. I and the mixture continuously sterilized by heating with steam at 300°F. The macro-nutrients are first dissolved in water to provide an aqueous concentrate which is then pumped to the mixing tank to provide the following feed rates for the component nutrients.

MACRONUTRIENTS

| Phosphoric Acid | 80% Solution | 1780 | lb./hr. |
|---|---|---|---|
| Potassium Chloride | KCl | 558 | do. |
| Magnesium Chloride | $MgCl_2 \cdot 6H_2O$ | 481 | do. |
| Calcium Chloride | 21.5% Moisture | 61 | do. |
| Ammonium Sulphate | $(NH_4)_2SO_4$ | 62 | do. |
| Sodium Carbonate | $Na_2CO_3 \cdot H_2O$ | 31 | do. |

The micro-nutrients are similarly provided as an aqueous concentrate, sterilized and pumped directly to the fermentor to provide the following feed rates for the component nutrients.

MICRONUTRIENTS

| Ferric Citrate | $Fe[C_3H_4(OH)(COO)_3]$ | 16.0 | lb./hr. |
|---|---|---|---|
| Manganous Sulphate | $MnSO_4 \cdot H_2O$ | 1.6 | do. |
| Zinc Sulphate | $ZnSO_4 \cdot 7H_2O$ | 1.8 | do. |
| Sodium Molybdate | $Na_2MoO_4 \cdot 2H_2O$ | 0.3 | do. |
| Potassium Iodide | KI | 0.2 | do. |
| Cupric Sulphate | $CuSO_4$ | 0.1 | |

Cooled sterile liquid is sent to the continuous fermentors operated at 90°F. under aseptic conditions. Air required for the fermentation is sterilized by passage through glass-fiber membrane-type filters and sparged into the bottom section of each fermentor where oxgen transfer is effected by intense agitation of the fermentation broth. Sterile air is introduced to each fermentor at a rate of 8,000 cu. ft./minute and oxygen transfer is effected with a turbine agitator. Anhydrous ammonia is added continuously to the fermentors as a nutrient, supplying the nitrogen content of the cells, in the total amount of 1,175 lbs./hr. which is sufficient to maintain the acidity level at pH 4.0.

Each fermentor is put on stream with addition of a starter culture of viable *Candida utilis* yeast cells grown in a batch seed tank.

Each fermentor is operated in the exponential phase of growth at 90°F. and pH 4.0, effecting a doubling of cell weight every 2.1 hours. Residence time in the fermentors is 3 hours.

Spent air containing unabsorbed oxygen and product carbon dioxide is released through a regulating valve. The heat of fermentation is removed by passage of ammonia coolant through a "bird-cage" cooling element of the type shown schematically in FIGS. 3 and 4. The "bird-cage" cooling element comprises 2 circular headers, made of 2 feet diameter pipe, fitted within the fermentor vessel and having an outside diameter of 16 feet. The headers are connected by 380 vertical tubes 21 feet in length, having 1 inch diameter, arranged in two parallel rows about the circumference of the headers to provide 2,600 square feet of surface area.

Total fermentor effluent, amounting to 500,000 lb./hr. of fermentation broth containing 2.0 wt. percent yeast cells, is separated by centrifuging into a yeast cell cream (50,000 lb./hr. containing 20.0 wt. percent yeast cells) and a supernatant aqueous solution containing residual ethanol and nutrient elements. The supernatant solution is partly (58,000 lb./hr.) sent to discard for waste processing and the remainder (392,000 lb./hr.) is recycled to the fermentor, in admixture with added nutrient elements and make-up water, after passing through the sterilizer.

The yeast cream is sent directly to a spray drier, recovered as a powder containing 5.0 wt. percent moisture, cooled and sent to storage.

What is claimed is:

1. In a continuous aerobic fermentation apparatus, including a vertical cylindrical fermentor vessel, an internal cooling apparatus in combination therewith, said cooling apparatus comprising,
   a. a top circular header pipe disposed horizontally within an upper section of the fermentor vessel;
   b. a bottom circular header pipe, aligned axially with and having substantially the same mean diameter as the top header pipe, disposed horizontally within a lower section of the fermentor vessel;
   c. a plurality of connector pipes, disposed vertically in a spaced relationship and severally attaching the bottom circular header pipe to the top circular header pipe, being arranged in parallel rows along the circumference described by the circular header pipes in sufficient number to provide a total cross-section area substantially equal to the cross-section area of either of the header pipes;
   d. an inlet pipe, extending horizontally through the fermentor vessel wall in sealed relation thereto in the plane of the bottom header pipe and attached at one end to the header pipe;
   e. an exit pipe, attached at one end to the top circular header pipe and extending horizontally therefrom and passing through the fermentor vessel wall in sealed relation therewith; and
   f. pumping and compressing means located externally of the fermentor vessel and attached externally thereof to the extended ends of both the inlet pipe and the exit pipe, in order to provide a continuously flowing system for containment of coolant liquid and vapor phases, whereby efficient indirect heat exchange is effected with a fermentation liquor contained in the sections of the fermentor vessel and surrounding the internal cooling apparatus, so that a substantially constant temperature is maintained within the fermentation liquor throughout the course of the aerobic fermentation processing; and said fermentor vessel comprising,
   1. an air inlet and outlet means attached to the top section;
   2. an agitator means located directly below the bottom circular header pipe;
   3. an air sparger means attached to the air entry means within the bottom section and situated directly beneath the agitator means;
   4. a nutrient inlet means attached to the top section;
   5. a fermentation broth outlet means attached to the bottom section; and
   6. two vertical baffle means located along the interior wall of the vessel on either side of the internal cooling apparatus.

2. The apparatus of claim 1 wherein the top and bottom circular header pipes are disposed within a fermentor vessel having a capacity of about 50,000 gallons and are fashioned from pipe having a diameter of about two feet to describe a circle whose outside diameter is about 16 feet.

3. The apparatus of claim 2 wherein the vertical connector pipes are fashioned from pipe having a diameter of about 1 inch and are arranged in two parallel rows about the circumference of the circular header pipes.

* * * * *

PO-1050
(5/69)

UNITED STATES PATENT OFFICE
CERTIFICATE OF CORRECTION

Patent No. 3,847,750          Dated November 12, 1974

Inventor(s) John A. Ridgway, Jr., Terry A. Lappin, Benny Moses Benjamin, Joseph B. Corns and Cavit Akin It is certified that error appears in the above-identified patent and that said Letters Patent are hereby corrected as shown below:

Column 3, line 25, "wtaer" should be -- water --.

Column 6, line 1, "flter" should be -- filter --.

Column 8, line 49, "Typtophane" should be -- Tryptophane --.

Column 9, line 25, "denstiy" should be -- density --;
        line 65, "solutin" should be -- solution --.

Signed and sealed this 4th day of March 1975.

(SEAL)
Attest:

RUTH C. MASON
Attesting Officer

C. MARSHALL DANN
Commissioner of Patents
and Trademarks